Figure 1:
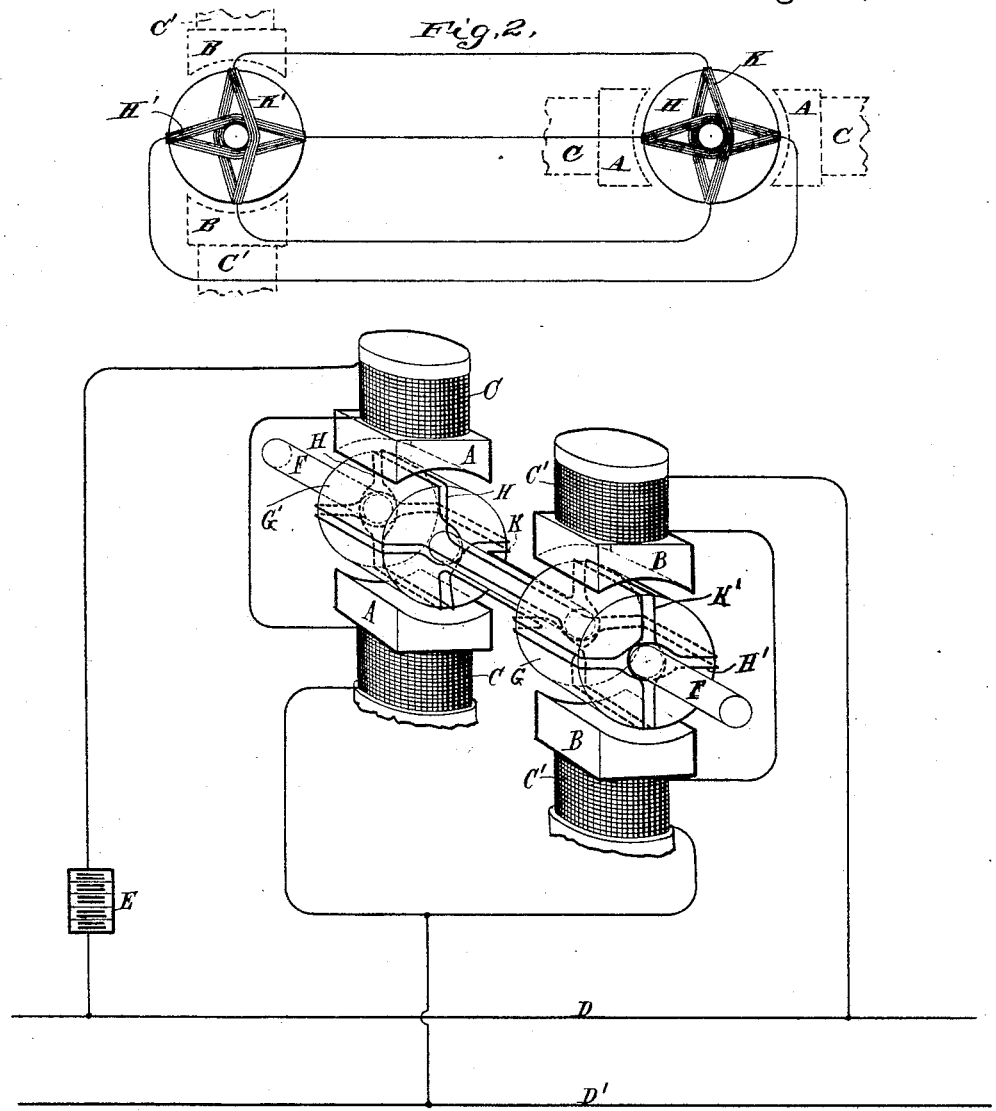

(No Model.)

W. STANLEY, Jr.
ALTERNATE CURRENT MOTOR.

No. 524,534.        Patented Aug. 14, 1894.

Witnesses:
Raphaël Netter
James Catlow

Inventor:
William Stanley Jr
by Duncan & Page.
Attorneys.

UNITED STATES PATENT OFFICE.

WILLIAM STANLEY, JR., OF PITTSFIELD, MASSACHUSETTS, ASSIGNOR TO THE STANLEY LABORATORY COMPANY, OF SAME PLACE.

ALTERNATE-CURRENT MOTOR.

SPECIFICATION forming part of Letters Patent No. 524,534, dated August 14, 1894.

Application filed April 13, 1892. Serial No. 428,950. (No model.)

*To all whom it may concern:*

Be it known that I, WILLIAM STANLEY, Jr., a citizen of the United States, residing at Pittsfield, in the county of Berkshire and State of Massachusetts, have invented certain new and useful Improvements in Alternate-Current Motors, of which the following is a specification, reference being had to the drawings accompanying and forming a part of the same.

The motor, subject of my present invention, is one involving the use of distinct or independent fields or sets of poles, and corresponding armatures, connected and combined in permanent relations to each other in such manner, that the magnetic effect of each field, in turn, shall induce in one portion of its armature coils the current that imparts the magnetism or magnetic poles to the other armature that coact with the field in which such armature is placed, in producing rotation. In the preferred form of motor which I have devised for this purpose, I employ two sets of field magnets having their poles in alignment with one another, which field magnets are adapted to set up fields of force independent of each other, in the sense that their effect is manifested in different planes, and these fields are energized by a source or sources of alternating currents in such manner that the magnetic phases of the two fields will be displaced with reference to one another. Within the influence of these fields two armatures are mounted, preferably on the same shaft and in fixed relations to each other, and which are wound, respectively, with coils. The coils of one armature are connected in closed series with those coils of the other which have a given angular displacement relatively to them.

Leaving out of consideration the causes that in practice tend to modify somewhat the theoretical conditions of operation of such motors, and assuming the conditions theoretically necessary for securing the highest efficiency of operation, the currents that energize the field cores should differ by a quarter period or what is commonly known as ninety degrees, so that at the instant of time when one field is at its maximum the other will be at zero. Under such conditions the coil on one armature which is in the position of maximum inductive effect with reference to its field should be that connected with or closed through the coil of the second armature which at the same moment is in the position to produce the most effective torque between the said second armature and its field, this position would be theoretically that of zero induction in the second field. If this principle of winding or connection be followed throughout, it is evident that the portions of the armature coils contained within the two fields respectively, become alternately induced and magnetizing circuits, and since the current of induction is maximum when the inducing current is zero, and since the one field is maximum when the other is zero, it follows that the maximum inductive action of one field coincides in time with the maximum dynamic action of the other.

I do not regard it as necessary to an understanding of the invention to enter into a discussion of the conditions that would obtain in the case of three fields produced by three sets of poles each excited by a current differing in phase from the current of any other field by sixty degrees, or other similar arrangements, as such dispositions would involve only well known modifications without departure from the principle of the invention.

In the accompanying drawings I have illustrated partly in perspective, and partly by means of a diagram, a motor constructed in accordance with my above described invention.

Figure 1 is a view of the preferred arrangement and Fig. 2 a similar view of a modification of the same.

A, B, designate the poles of the two fields, respectively, which are in substantially parallel planes and in this case are shown as being in alignment with one another. These poles are energized by coils C, C', connected with one or more sources of alternating currents. In case the currents be derived from a single circuit, the coils may be placed in parallel and any suitable means such as a self-induction coil, a condenser or polarization cell E is used to produce in the two coils the proper difference in phase.

On a common shaft F are mounted two magnetic cores G, G', one in each of the fields produced by the poles A, B. For convenience of illustration each core is shown as wound, in a direction parallel to its axis, with two coils at right angles to each other. Of these the coil H in one field is connected with or closed through the coil H' in the other field, which occupies a position at right angles to the first. The other two coils K, K' are similarly connected or closed through one another.

The operation of this motor may be described as follows:—If alternating currents from a main circuit D, D' be carried by two field circuits of such different electrical character as to produce a difference of ninety degrees, in the phase of the two currents, and consequently of the magnetic phase of the two fields A and B, respectively, at any given moment when the magnetism of one field, as A, is undergoing the greatest rate of change, in other words is at zero, the maximum induced current will be developed in the coil K, which being closed through the coil K' tends to establish in the core G' poles at right angles to the lines of force of the field produced by the poles B, which at the same time are at their maximum. As this action ceases the poles B in their turn induce in the coil H' a current that produces a like effect in the core G, and this operation continues, each core becoming alternately one of the elements of a motor and a transformer.

The above is, of course, a purely theoretical description of the mode of operation which will be affected by working conditions in well understood ways.

The operative conditions secured, as above described, by an alignment of the field poles, and an angular displacement or distortion of the armature coils may obviously be attained by reversing these relations, that is to say, by placing the poles of the two fields at an angle relatively to each other and maintaining the armature coils in alignment. This is illustrated in Fig. 2, in which like letters of reference to those in the preceding figure indicate corresponding parts.

The invention is not limited to any particular forms of field magnets or armatures, it being, of course, desirable that the usual conditions for efficient working be observed, such as the well understood sub-division of the cores of the fields and armatures.

What I claim as my invention is—

1. An alternate current motor consisting of independent field magnets or sets of poles, the several sets of poles being in parallel planes and having each an energizing circuit, the currents of which circuits are of different phase and also having, when energized by such currents, separate and distinct fields of force, the several poles of each field being simultaneously energized in combination with an armature having coils thereon within each field, the coils within one field being connected with or closed through coils in another field, the connected coils being in different positions relatively to the pole pieces of the field magnets of their respective fields, substantially as described.

2. An alternating current motor, consisting of independent field magnets or sets of poles adapted to be energized by alternating currents of different phase, in combination with an armature and coils thereon within the influence of each field, the coils in one field being connected with or closed through coils in the other field distorted or displaced with reference to the first, as set forth.

WILLIAM STANLEY, Jr.

Witnesses:
 HARRY A. DUNBAR,
 WARREN E. DAY.